(12) United States Patent
Niewiadomski et al.

(10) Patent No.: US 11,208,145 B2
(45) Date of Patent: Dec. 28, 2021

(54) AUTOMATED HITCHING SYSTEM WITH STEERING ACQUISITION AND HANDOFF

(71) Applicant: Ford Global Technologies, LLC, Dearborn, MI (US)

(72) Inventors: Luke Niewiadomski, Dearborn, MI (US); Kyle Simmons, New Boston, MI (US); Arnav Sharma, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 267 days.

(21) Appl. No.: 16/269,974

(22) Filed: Feb. 7, 2019

(65) Prior Publication Data

US 2020/0255066 A1    Aug. 13, 2020

(51) Int. Cl.
*B62D 15/02* (2006.01)
*B60D 1/36* (2006.01)

(52) U.S. Cl.
CPC ......... *B62D 15/025* (2013.01); *B62D 15/021* (2013.01); *B60D 1/36* (2013.01)

(58) Field of Classification Search
CPC ...... B62D 15/025; B62D 15/021; B62D 1/00; B60D 1/36; B60L 2240/24; B60W 2510/20
See application file for complete search history.

(56) References Cited

U.S. PATENT DOCUMENTS

| | | | |
|---|---|---|---|
| 8,038,166 B1 | 10/2011 | Piesinger | |
| 8,191,915 B2* | 6/2012 | Freese, V | B60D 1/58 280/477 |
| 8,825,262 B2 | 9/2014 | Lee et al. | |
| 8,890,716 B2 | 11/2014 | Takano et al. | |
| 9,140,553 B2 | 9/2015 | Grimm et al. | |
| 10,214,062 B2* | 2/2019 | Huger | G06K 9/00791 |
| 10,351,061 B1* | 7/2019 | Chaudhari | B60D 1/36 |
| 2007/0193868 A1* | 8/2007 | Rouleau | B60R 16/027 200/339 |
| 2010/0096203 A1* | 4/2010 | Freese, V | B60D 1/58 180/167 |
| 2012/0283909 A1 | 11/2012 | Dix | |
| 2014/0303847 A1* | 10/2014 | Lavoie | B62D 13/06 701/41 |
| 2015/0115571 A1* | 4/2015 | Zhang | H04N 7/183 280/477 |
| 2015/0197278 A1* | 7/2015 | Boos | B62D 13/06 701/2 |
| 2016/0023601 A1* | 1/2016 | Windeler | B62D 15/0275 348/118 |
| 2016/0052548 A1* | 2/2016 | Singh | B60D 1/36 701/37 |
| 2019/0315397 A1* | 10/2019 | Weigl | B62D 5/06 |

* cited by examiner

*Primary Examiner* — Ig T An
(74) *Attorney, Agent, or Firm* — Raymond Coppiellie; Price Heneveld LLP

(57) ABSTRACT

A vehicle hitching assistance system includes a steering system having steered vehicle wheels mounted on an exterior of the vehicle and a steering motor mechanically coupled with the steered vehicle wheels. The system further includes controller that acquires control of the steered vehicle wheels by connection with the steering motor and, after acquiring control of the steered vehicle wheels, receives a command to execute an automated hitching maneuver and controls the steered vehicle wheels using the steering motor.

19 Claims, 12 Drawing Sheets

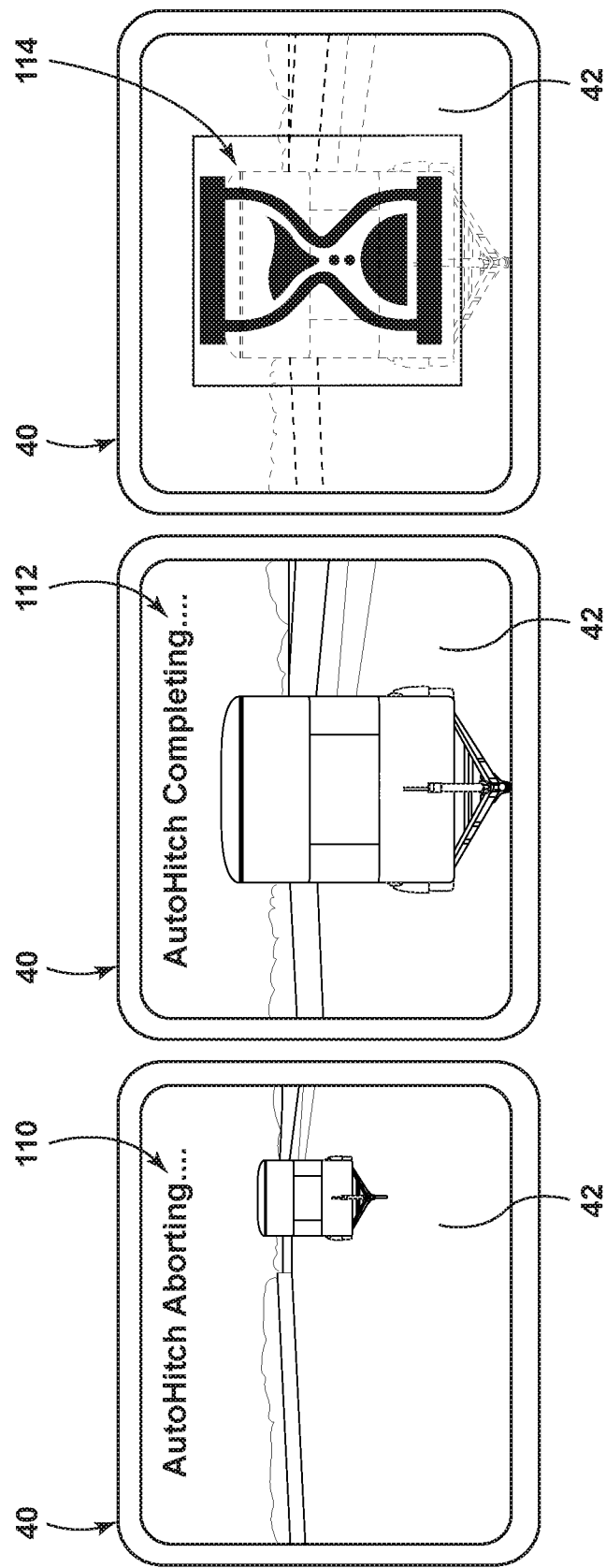

US 11,208,145 B2

AUTOMATED HITCHING SYSTEM WITH STEERING ACQUISITION AND HANDOFF

FIELD OF THE INVENTION

The present invention generally relates to a system for assisting in a vehicle-trailer hitching operation. In particular, the present disclosure relates to a system with improved process for system acquisition and handoff of steering system control.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE INVENTION

According to one aspect of the present invention, a vehicle hitching assistance system includes a steering system having steered vehicle wheels mounted on an exterior of the vehicle and a steering motor mechanically coupled with the steered vehicle wheels. The system further includes controller that acquires control of the steered vehicle wheels by connection with the steering motor and, after acquiring control of the steered vehicle wheels, receives a command to execute an automated hitching maneuver and controls the steered vehicle wheels using the steering motor.

Embodiments of the first aspect of the invention can include any one or a combination of the following features:
  upon one of completing the automated hitching maneuver or no longer receiving the command to execute the automated hitching maneuver, the controller causes the steered vehicle wheels to move to a zero-degree turn position;
  after causing the steered vehicle wheels to move to the zero-degree turn position, the controller relinquishes control of the steered vehicle wheels;
  the steering system further includes a steering wheel mounted in an interior of the vehicle and mechanically coupled with the steered vehicle wheels;
  the controller causes the steering motor to move the steering wheel to indicate control of the steered vehicle wheels;
  the controller causes the steering motor to move the steering wheel in a low-amplitude oscillation to indicate control of the steered vehicle wheels;
  the controller further receives a command to initiate the automated hitching maneuver before acquiring control of the steered vehicle wheels;
  acquiring control of the steered vehicle wheels includes determining an initial steered vehicle wheel angle and sending a command to the steering motor corresponding with movement of the steered vehicle wheels to the initial steered vehicle wheel angle; and
  the steering system further includes a steering angle sensor, the controller being in communication with the steering angle sensor, and the controller determines the initial steered vehicle wheel angle from the steering angle sensor.

According to another aspect of the present invention, a vehicle hitching assistance system includes a steering system having steered vehicle wheels mounted on an exterior of the vehicle and a steering motor mechanically coupled with the steered vehicle wheels. The system further includes a controller that receives a command to execute an automated hitching maneuver, executes the automated hitching maneuver including controlling the steered vehicle wheels using the steering motor, and upon ending the automated hitching maneuver, causes the steered vehicle wheels to move to a zero-degree turn position.

According to another aspect of the present invention, a vehicle includes a steering system having steered vehicle wheels mounted on an exterior of the vehicle, and a steering motor mechanically coupled with the steered vehicle wheels. The vehicle further includes a controller that acquires control of the steered vehicle wheels by connection with the steering motor, after acquiring control of the steered vehicle wheels, receives a command to execute an automated hitching maneuver and controls the steered vehicle wheels using the steering motor, and upon ending the automated hitching maneuver, causes the steered vehicle wheels to move to a zero-degree turn position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIGS. 12A-12C are front views of a vehicle human-machine interface showing example messages presentable during steps of the vehicle relinquishing control of a vehicle steering system to a driver.

DETAILED DESCRIPTION OF THE PREFERRED EMBODIMENTS

Figure 1:
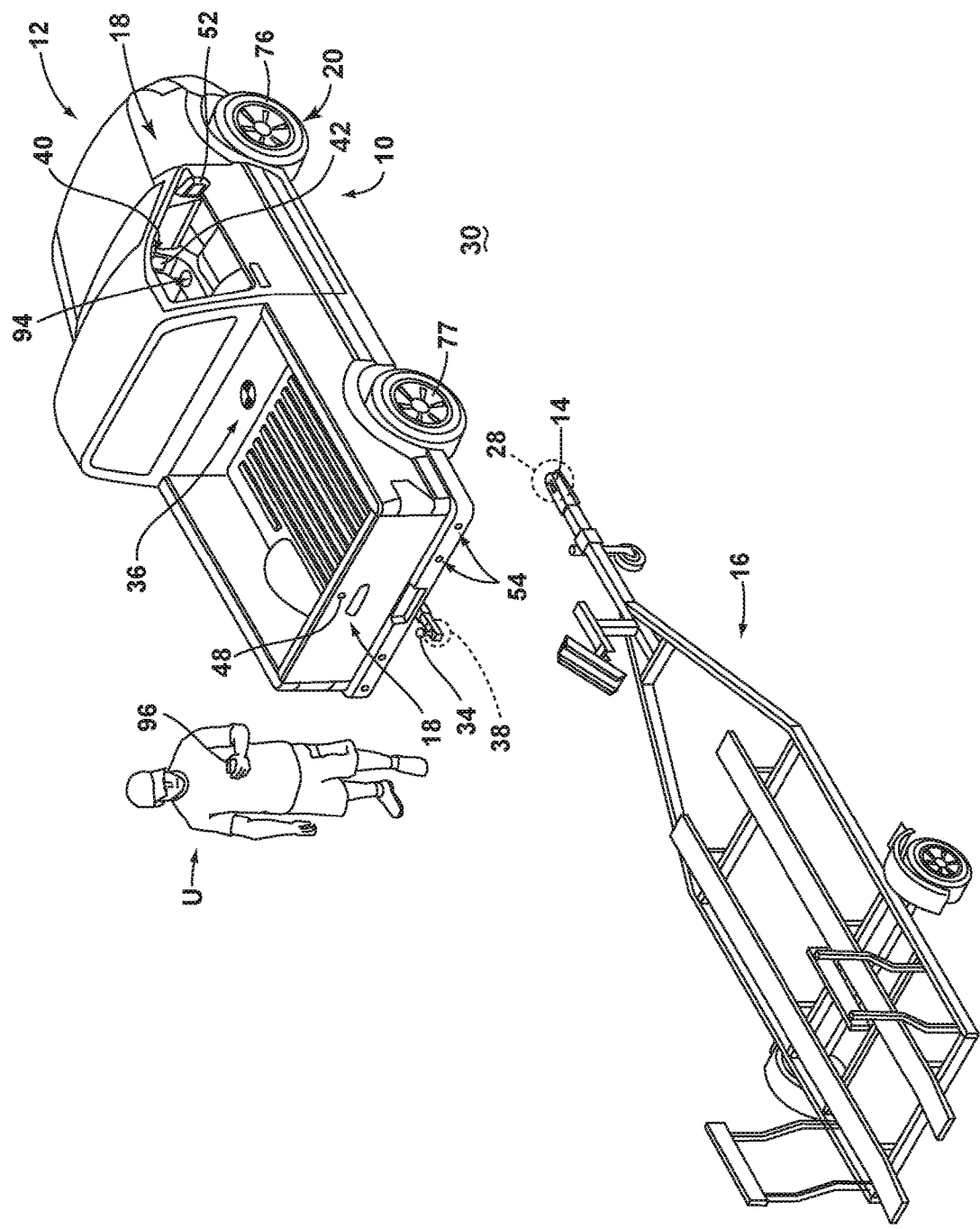
FIG. 1 is a is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-12C, reference numeral 10 designates a vehicle hitching assistance system. The system 10 may be included with the depicted vehicle 12 having a steering system 20 with steered vehicle wheels 76 mounted on an exterior of the vehicle 12 and a steering motor 74 mechanically coupled with the steered vehicle wheels 76. The vehicle 12 further includes a controller 26 acquiring control of the steered vehicle wheels 76 by connection with the steering motor 74. After acquiring control of the steered vehicle wheels 76, the controller 26 receives a command to execute an automated hitching maneuver and controls the steered vehicle wheels 76 using the steering motor 74. Upon one of completing the automated hitching maneuver or no longer receiving the command to execute the automated hitching maneuver, the controller 26 causes the steered vehicle wheels 76 to move to a zero-degree turn position.

Figure 2:
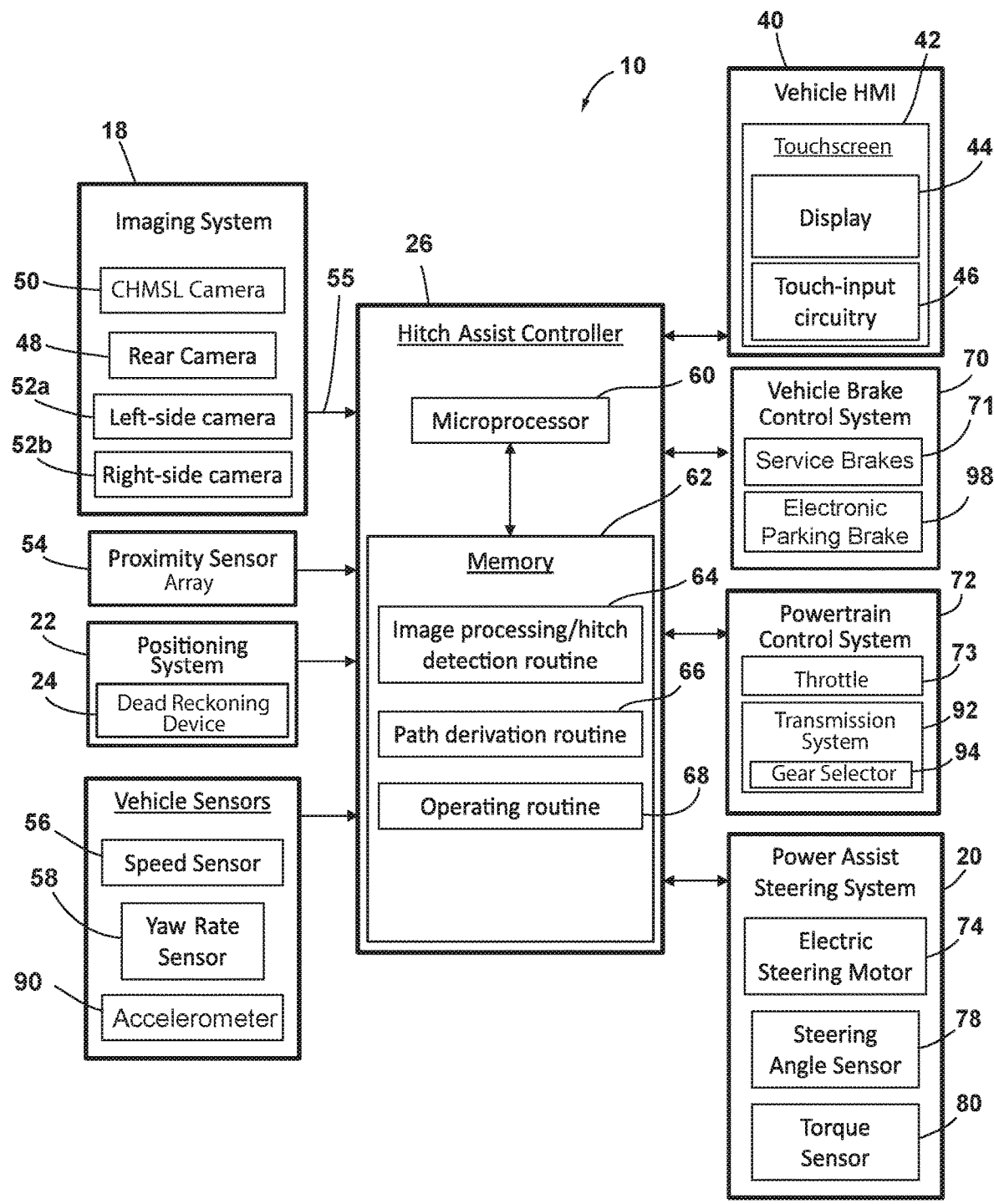
FIG. 2 is a diagram of a system according to an aspect of the disclosure for assisting in aligning the vehicle with a trailer in a position for hitching the trailer to the vehicle.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle δ. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position (e.g., based on the distance $D_h$ and angle $α_h$) of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle δ. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command may be provided by the hitch assist system 10 for autonomously steering during a trailer hitch alignment maneuver and may alternatively be provided manually via a rotational position (e.g., turned angle) of a steering wheel 30 of vehicle 12. However, in the present example, the steering wheel 30 of the vehicle 12 is mechanically coupled with the steered wheels 76 of the vehicle 12, such that the steering wheel 30 moves in concert with steered wheels 76, preventing manual intervention with the steering wheel 30 during autonomous steering. More specifically, a torque sensor 80 is provided on the power assist steering system 20 that senses torque on the steering wheel 30 that is not expected from autonomous control of the steering wheel 30 and therefore indicative of manual intervention, whereby the hitch assist system 10 may alert the driver to discontinue manual intervention with the steering wheel 30 and/or discontinue autonomous steering. In alternative embodiments, some vehicles have a power assist steering system 20 that allows a steering wheel 30 to be partially decoupled from movement of the steered wheels 76 of such a vehicle.

Figure 3:
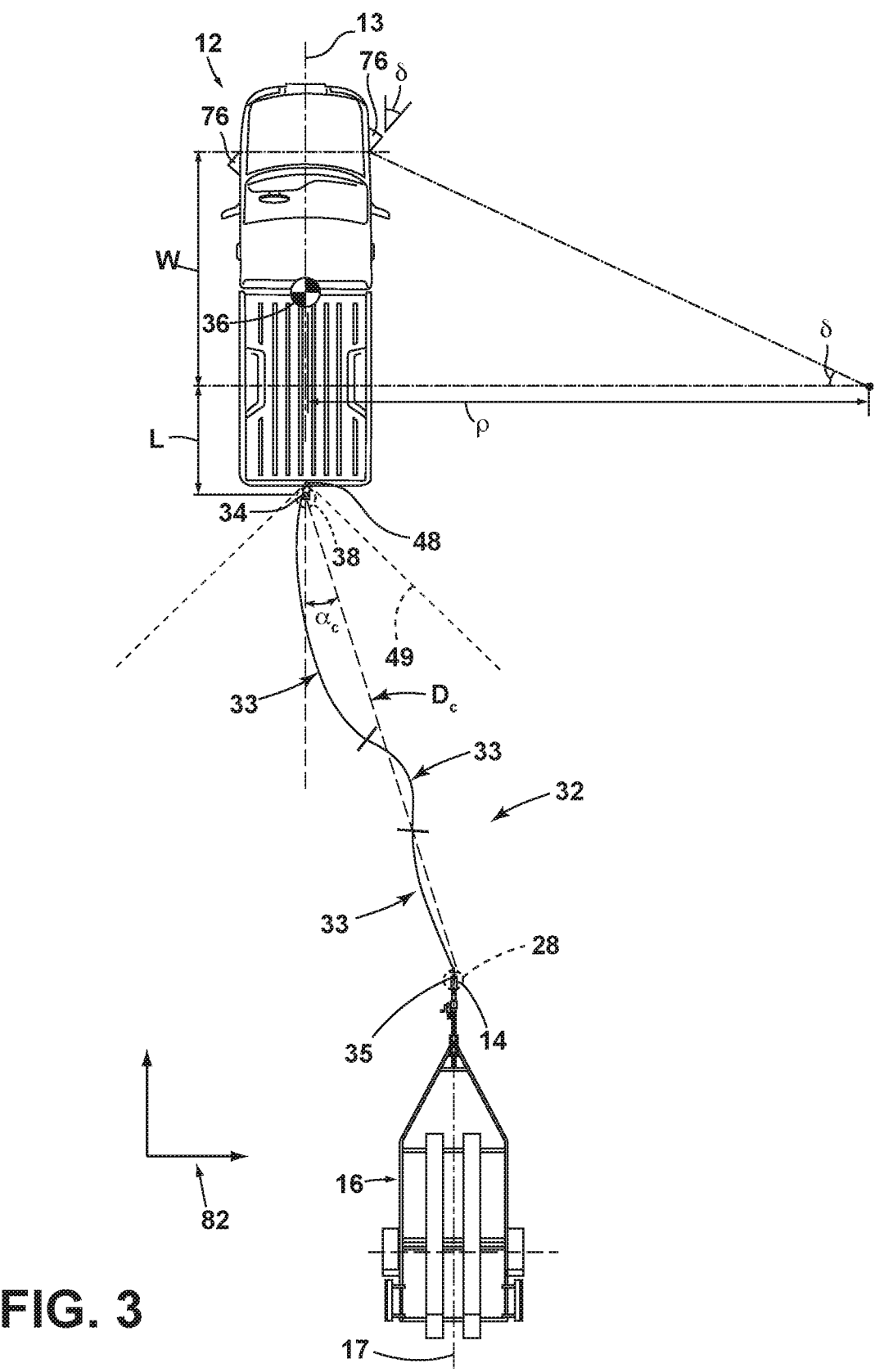
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72, and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate $\gamma\&$, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CHMSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CHMSL) camera 50, and side-view cameras 52a and 52b, respectively. In this manner, image data from two or more of the cameras can be combined in image processing routine 64, or in another dedicated image processor within imaging system 18, into a single image. In an extension of such an example, the image data can be used to derive stereoscopic image data that can be used to reconstruct a three-dimensional scene of the area or areas within overlapped areas of the various fields of view 49, 51, 53a, 53b, including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

The image processing routine 64 can be specifically programmed or otherwise configured to locate coupler 14 within image data. In an example, the image processing routine 64 can first attempt to identify any trailers 16 within the image data, which can be done based on stored or otherwise known visual characteristics of trailer 16, of a number of different types, sizes or configurations of trailers compatible with system 10, or trailers in general. Controller 26 can seek confirmation from the user that the identification of the trailer 16 is accurate and is the correct trailer for which to complete an automated hitching operation, as described further below. After the trailer 16 is identified, controller 26 may then identify the coupler 14 of that trailer 16 within the image data based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data, as well as the positioning of coupler 14 relative to such a marker so that the position 28 of coupler 14 can be determined based on the marker location. Additionally or alternatively, controller 26 may seek confirmation of the determined coupler 14, via a prompt on touchscreen 42. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data.

In various examples, controller 26 may initially rely on the identification of trailer 16 for the initial stages of an automated hitching operation, with the path 32 being derived to move the hitch ball 34 toward a centrally-aligned position with respect to trailer 16 with the path 32 being refined once the coupler 14 is identified. Such an operational scheme can be implemented when it is determined that trailer 16 is at a far enough distance from vehicle 12 to begin backing without knowing the precise endpoint 35 of path 32 and can be useful when trailer 16 is at a distance where the resolution of the image data makes it possible to accurately identify trailer 16, but at which the coupler 14 cannot be precisely identified. In this manner, initial rearward movement of vehicle 12 can allow for calibration of various system 10 inputs or measurements that can improve the accuracy of distance measurements, for example, that can help make coupler 14 identification more accurate. Similarly, movement of vehicle 12 resulting in a change to the particular image within the data that can improve the resolution or move the coupler 14 relative to the remaining portions of trailer 16 such that it can be more easily identified.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data and at least attempt to estimate the position 28 of coupler 14 relative to hitch ball 34 using the image data in accordance with one of the examples discussed above to determine a distance $D_c$ to coupler 14 and an angle $\alpha_c$ of offset between coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 33 of trailer 16. In this manner the path 32 can further be derived to align vehicle 12 with respect to trailer 16 with the longitudinal axis 13 of vehicle 12 within a predetermined angular range of the heading 33 of trailer 16. Notably, such alignment may not require that the longitudinal axis 13 of vehicle 12 is parallel or collinear with the heading 33 of trailer 16, but may simply be within a range that generally allows connection of hitch ball 34 with coupler 14 without collision between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 33 is less than the jackknife angle between the vehicle 12 and trailer 16 when coupled or a reasonable estimate thereof. In one example, the angular range may be such that longitudinal axis 13 is within about 30° from collinear with heading 33 in either direction. In various examples, such as when the length L of trailer 16 is known, the angular range may be greater, when permitted, or may be less, depending on the desired tolerance of system 10.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as the drawbar length L, as well as the maximum angle to which the steered wheels 76 can be turned $\delta_{max}$. As shown, the wheelbase W and the current steering angle δ can be used to determine a corresponding turning radius ρ for vehicle 12 according to the equation:

$$\rho = \frac{1}{W \tan \delta}, \qquad (1)$$

in which the wheelbase W is fixed and the steering angle δ can be controlled by controller 26 by communication with steering system 20, as discussed above. In this manner, when the maximum steering angle $\delta_{max}$ is known, the smallest possible value for the turning radius $\rho_{min}$ is determined as:

$$\rho_{min} = \frac{1}{W \tan \delta_{max}}. \qquad (2)$$

Path derivation routine 66 can be programmed to derive vehicle path 32 to align a known location of the vehicle hitch ball 34 with the estimated position 28 of coupler 14 that takes into account the determined minimum turning radius $\rho_{min}$ to allow path 32 to use the minimum amount of space and maneuvers. In this manner, path derivation routine 66 can use the position of vehicle 12, which can be based on the center 36 of vehicle 12, a location along the rear axle, the location of the dead reckoning device 24, or another known location on the coordinate system 82, to determine both a lateral distance to the coupler 14 and a forward or rearward distance to coupler 14 and derive a path 32 that achieves the needed lateral and forward-backward movement of vehicle 12 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14. It is noted that hitch assist system 10 can compensate for horizontal movement Δx of coupler 14 in a driving direction toward vehicle 12 by determining the movement of coupler 14 in the vertical direction Δy that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein.

As discussed above, once the desired path 32, including endpoint 35, has been determined using either of the offset determination schemes discussed above, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle δ, as dictated by path 32, depending on the position of vehicle 12 therealong. It is additionally noted that in an embodiment, the path 32 may comprise a progression of steering angle δ adjustment that is dependent on the tracked vehicle position.

As illustrated in FIG. 3, vehicle path 32 can be determined to achieve the needed lateral and rearward movement within the smallest area possible and/or with the lowest number of maneuvers. In the illustrated example of FIG. 3, path 32 can include multiple portions defined by steering of wheels 76 in different directions to collectively traverse the needed lateral movement of vehicle 12, while providing final straight, rearward backing segment to bring hitch ball 34 into the above-described offset alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from portable device or smartphone 96, can be fine-tuned once the image processing routine 64 can identify coupler 14 in the image data, with continued updates for path 32 being similarly derived as the image data becomes increasingly clear during the approach toward trailer 16. It is further noted that, until such a determination can be made, the dead reckoning device 24 can be used to track the location of vehicle 12 in its movement along path 32 toward the initially-derived endpoint 35.

As can be appreciated, the complete process of utilizing system 10 to align the hitch ball 34 of vehicle 12 with the coupler 14 of trailer 16, involves both regular driving of vehicle under the control of the driver in addition to the above-described backing of vehicle 12 under control of system 10. In particular, the driver will most often initially maneuver the vehicle 12 into a position where trailer 16 is in a position such that system 10 can identify the trailer 16 or coupler 14, as discussed above. In the event that vehicle 12 is started in a position relative to trailer 16 such that the identification is immediately possible, the vehicle will still be started in a condition for driving by the user. Accordingly, there will be a need for system 10 to acquire control of vehicle 12, including the steering of vehicle 12 for the automated backing toward trailer 16. In this respect, system 10 can operate to indicate readiness to control vehicle 12 to the user and/or that control of the steering system 20, in particular, has been acquired. Further, system 10 is configured overcome various other limitations of system 10 to provide such indication at a time that is aligned with user expectations, which can improve user experience and reduce instances of user interference with system 10 operation.

Figure 4:
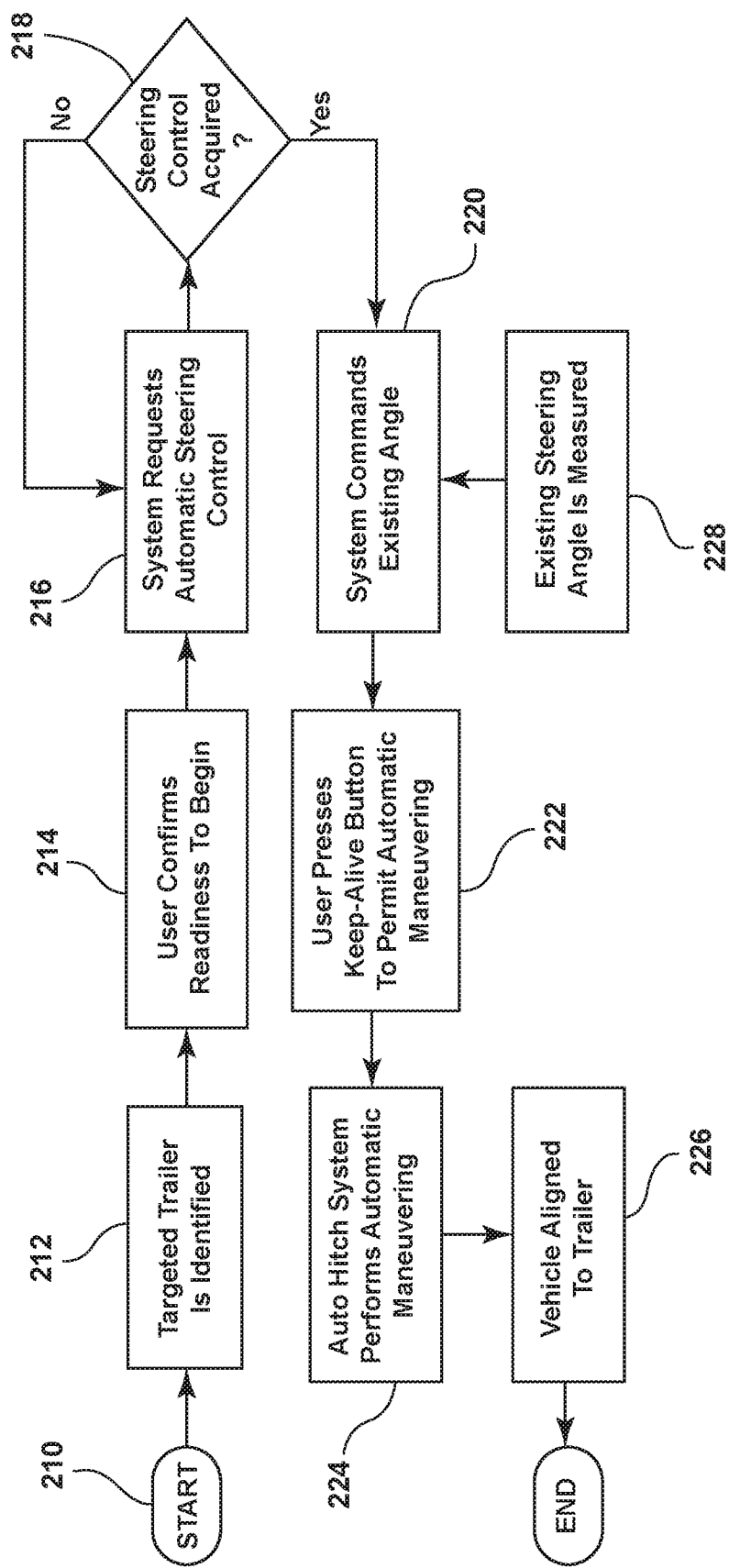
FIG. 4 is a flowchart depicting steps in the alignment sequence, including for the vehicle acquiring control of a vehicle steering system.

In particular, as shown in FIG. 4, the process for system 10 to acquire and indicate vehicle control is incorporated into the initial stages of the overall operation of system 10, as generally discussed above. As discussed, system 10 can start the hitching operation 210 upon an indication by user, such as by selection of an appropriate menu item via HMI 40 or by activation of a softbutton presented on HMI (which may be done automatically when vehicle 12 is in reverse and/or when a trailer 16 is identified by imaging system 18) or a physical button on the vehicle 12 instrument panel. Subsequently, system 10 executes the above-described image processing routine 64 in communication with imaging system 18 to identify 212 trailer 16 and/or coupler 14 within the field of view of one or more cameras 50 (or a particular area within the field of view). When the trailer 16 or coupler 14 has been identified, system 10 indicates the identification (by way of HMI 40, for example) and the readiness of system 10 to navigate vehicle 12 toward trailer 16. In the present example, system 10 can be configured to actually initiate the process of controlling vehicle 12 to navigate toward trailer 16 upon the driver shifting 214 the vehicle 12 transmission 92 into neutral, which is interpreted by system 10 as an indication of the driver's readiness to begin the automated hitching process. At this point, system 10 can run the path derivation routine 66, which can, among other things, produce an initial steering angle δ that will be commanded by system 10 when operating routine 68 begins. System 10, however, will wait at this point to actually begin operating routine 68 until a command from the user, as discussed below. According to the present disclosure, system 10 may prepare for such a command, and the corresponding execution of operating routine 68, prior to such a command by acquiring control of steering system 20 when the user readiness indication 212 is received and indicating to the user that such control has been acquired.

As shown, acquisition of control of steering system 20 by controller 26 can be facilitated by steering system 20 having an operating mode wherein the steering motor 74 operates in an steering angle control mode, wherein the steering system 20 receives a particular steering angle δ as an input, rather than, for example, a steering wheel 30 torque (discussed further below). In this respect, controller 26 can acquire control of steering system 20 by requesting 216 that steering system 20 operate in the steering angle control mode and that it receives the steering angle δ input from controller 26 as an output of operating routine 68, when running. In this respect, there may be one or more preconditions required for system 10 to gain control of steering system 20 in this manner. System 10 evaluates 218 these preconditions and, if they are not met, the system 10 continue requesting 216 control until the preconditions are met or the operation is canceled. In various examples, for controller 26 to be given control of steering system 20, the vehicle speed must be below a threshold, the torque applied to the steering wheel 30 must be below a threshold. Additionally, there may be a time-based precondition such that, after control is requested 216, a current steering wheel 30 angle must be held for a certain amount of time to ensure proper engagement of the steering motor 74.

When the required preconditions are met, controller 26 is given control of steering system by way a connection (direct or indirect) with steering motor 74. As discussed, in the present example, this is done by allowing the controller to output the steering angle δ of operating routine 68 as an input to steering system 20 in the steering angle control mode. Again, as the operating routine 68 is not yet running, no steering angle δ is output by operating routine so, under such conditions, system 10 would not respond to control being allowed in a perceivable manner. Accordingly, system 10 can, upon such control being granted, send output command 220 an indication that steering control has been acquired (and, thus, that system 10 is ready to automatically execute the hitching maneuver) before operating routine 68 is actually activated. In one example, system 10 can output a message or other visual indication of the acquisition via HMI 40. In another example, system 10 can leverage the available control of steering system 20 in a preemptive manner to give a tactile indication, perceivable to the driver, of the control acquisition. In a still further example, such visual and tactile indications can be given simultaneously. After acquiring control of the steered vehicle wheels 76 and providing output command 220 the desired indication thereof, the controller 26 waits to receive a command 222 to execute the automated hitching maneuver. In one aspect, the command may be given by the user pressing an additional softbutton on HMI 40 or by pressing an additional physical button on the instrument panel or the same button used to start the hitching operation 210 initially. In one aspect, the button may be a "keep alive" button such that the user must continue to depress the button for system 10 to start and maintain the operating routine 68. Should the user stop depressing such a button, the operating routine 68 can either be paused or aborted entirely. In either example, upon receiving the output command 220, system 10 allows controller 26 to control the steered vehicle wheels 76 using the steering motor 74 to perform the automated hitching maneuver 224 (which may further include control of the vehicle brake control system 70 and/or the powertrain control system 72) until the desired alignment with coupler 14 is achieved 226.

Figure 5:
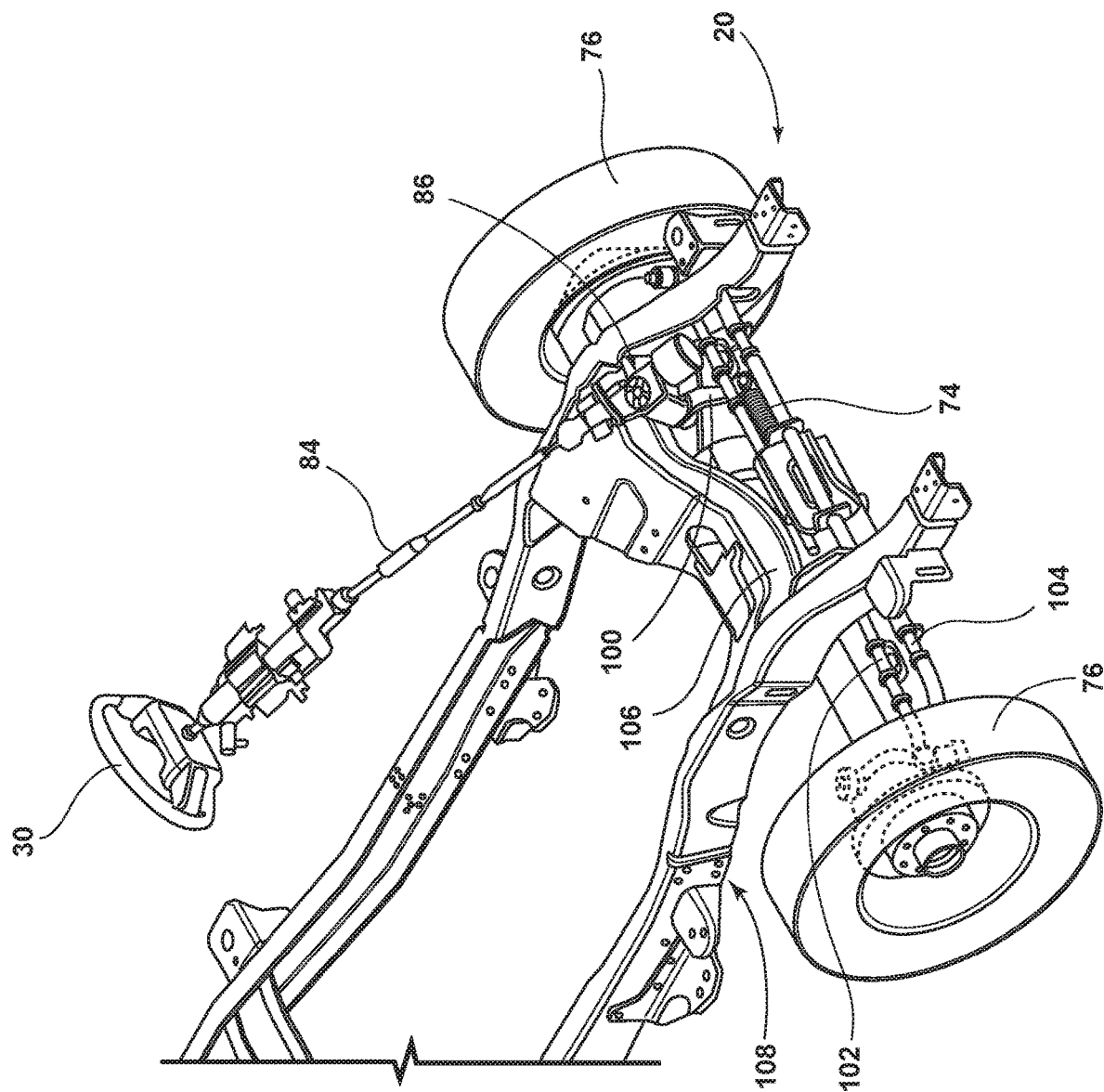
FIG. 5 is a perspective view of an example vehicle steering system.
Figure 6:
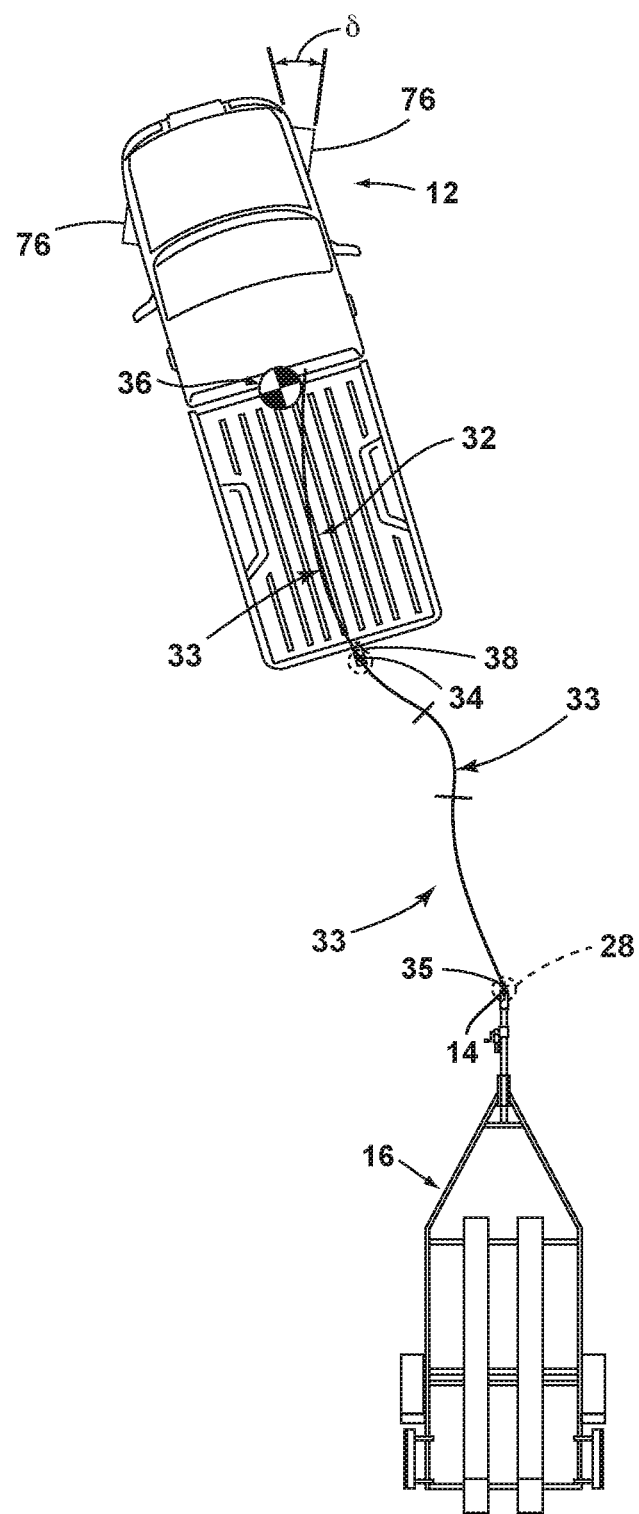
FIG. 6 is an overhead schematic view of the vehicle during a subsequent step of the alignment sequence with the trailer.

To provide above-mentioned tactile indication of steering system 20 control, controller 26 can cause some degree of movement of steering wheel 30. In one application, the structure of steering system 20 and its integration into vehicle 12 can facilitate such movement in an effective manner. In one aspect, the system 10, as described herein includes an implementation of the steering system 20 with the steered vehicle wheels 76 mounted on the exterior of the vehicle 12, as shown in FIG. 1. As discussed above, the steering motor 74 of the steering system 20 is mechanically coupled with the steered vehicle wheels 76. As shown in FIG. 5, the steering system 20 further includes the steering wheel 30, which is mounted in the interior of the vehicle 12 and is mechanically coupled with the steered vehicle wheels 76. In particular, steering wheel 30 can be indirectly coupled to steering column 84 such that rotation of the steering wheel 30 causes rotation of the steering column 84 (and vice-versa). The steering column 84 may be coupled oppositely from steering wheel 30 to a recirculating ball nut mechanism 86 at an input thereof.

The recirculating ball nut mechanism 86 may be of a general or appropriate construction and may include an output or link member 100 that rotates between at least a first position in which the steered wheels 76 are turned all the way to the left (i.e. at the maximum steering angle $δ_{max}$) and a second position in which the steered wheels 76 are turned all the way to the right (also at the maximum steering angle $δ_{max}$). More particularly, the output member 100 of the mechanism 86 may be coupled to a drag link 102. The drag link 102 is oppositely coupled to a steering knuckle of one of the steered wheels 76 (e.g., the right-hand steered wheel 76) such that movement of the output member 100 moves the drag link 102 causing the steering knuckle to rotate the wheel to change the steering angle δ of that steered wheel 76. The steering knuckle of the right-hand steered wheel 76 may also be coupled to a tie rod 104. The tie rod 104 may be oppositely coupled to the steering knuckle of the left-hand steered wheel 76 such that movement of the steering knuckle of the right-hand steered wheel 76 is directly transferred to movement of the left-hand steered wheel 76 by the tie rod 104 to simultaneously change the steering angle δ of that steered wheel 76. While the present illustrated example is disclosed as including a drag link steering geometry as part of the steering system 20, it should be understood that the illustrated example may also include a Haltenberger or a parallel link steering system or any other steering system that may be usable or appropriate in a vehicle according to the depicted example.

The steering system 20 further includes the above-mentioned steering motor 74. The output of the steering motor 74 may be provided as an input to the drag link 102 at the same point of connection with the output member 100 of ball nut mechanism 86 for assisting in rotating the steered wheels 76. The steering motor 74 may be oppositely coupled to and supported on a crossbeam support or cross member 106 that may extend between the left-hand and right-hand beams of the vehicle frame 108 to transfer the forces generated by the steering motor 74 to the drag link 102 using the vehicle frame 108 as a base. The steering motor 74 may be supplied with electrical power from the electrical system of the vehicle. The 74 is configured with an internal electrical motor that generates a rotary output to drive linear movement of the output thereof (i.e. the portion coupled to drag link 102). Additional aspects and further examples of an EPAS steering system 20 useable in connection with the system 10 described herein are found in commonly-assigned U.S. Pat. No. 8,893,846, the entire disclosure of which is hereby incorporated by reference herein.

The steering motor 74 of the illustrated example may be controlled as desired or necessary to provide steering assist during operation of the vehicle. As discussed above, a controller can be connected with the steering motor 74 to supply a variable current or to otherwise vary the output of the steering motor 74 to provide the desired steering assistance characteristic for system 20, including assistance meeting expectations for a typical power-assisted steering system during normal driving of the subject vehicle 12. As also discussed above, the present controller 26 that is used to implement the hitch assistance functionality described herein 26 may be the controller 26 associated with and used to control EPAS steering system 20, including during driving without the use of operating routine 68, for example. More particularly, the hitch assistance functionality described herein can be included within the functionality of the steering system 20 such that the controller 26 executing operating routine 68 and the like is the controller of the steering system 20. During normal driving, the controller 26 can use input from torque sensor 80 in a closed-loop manner, for example, to allow user inputs on steering wheel 30 to control the output of steering motor 74 to provide the desired power assistance to the steering provided by the user (with additional inputs taken in various examples, from steering angle sensor 78, vehicle speed sensor 56, and the like).

System 10 can operate by having controller 26 take full control of the steering system 20 through established communication with steering motor 74 in the above-described steering angle control mode. In particular, controller 26 can, by way of its connection with steering motor 74, operate steering motor 74 to command a desired steering angle δ, as called for by operating routine 68 (for example, without seeking input from torque sensor 80) and measured by steering angle sensor 78. In a further example, controller 26 can actually use an input from torque sensor 80 as a fault signal in operating routine 68 that, under certain conditions, can result in operating routine 68 terminating to abort the hitch assistance maneuver.

By the connection between steering wheel 30 and controller 26 by way of steering motor 74 in the present example or other similar examples, the controller 26 may cause the steering motor 74 to move the steering wheel 30 to indicate control of the steered wheels 76, as discussed above. In particular, the controller can cause the steering motor 74 to move the steering wheel 30 in a low-amplitude oscillation to indicate that controller 26 has acquired control of the steered vehicle wheel 76. In one example, this movement may be achieved by controller 26 determining 228 an initial steering angle δ of the steered wheels 76 (i.e. an "initial steered vehicle wheel angle") from the steering angle sensor 78 and sending that steering angle δ as a control input for steering motor 74, which is operating in the steering angle control mode. Because the controller 26 is commanding the same steering angle that is already in place, the position of the steered wheels 76 will not effectively change and vehicle 12 will not change position. By sending an active steering angle command input, however, system 10 will cause the steering motor 74 to engage, which will cause a small but noticeable tactile indication to the user by moving the steering wheel 30. This movement may be characterized as a flutter, vibration, stiffening, twitch, or jerk of the steering wheel 30, thus informing the driver the system 10 has acquired control of the steering system 20.

As discussed above, the described tactile indication of steering system 20 control by system 10 communicates to the user that the system 10 is ready to begin the automated hitching maneuver. In this manner, by the time the user provides the command 222 to begin the maneuver, the system 10 can responds quickly in beginning to control the steering angle δ to follow the planned path 32, at least in part because steering motor 74 is already engaged. This engagement results in little to no delay in system 10 commanding the desired steering angle δ, per operating routine 68, and the corresponding movement of vehicle 12, upon the user providing the command 222. Additionally, certain control schemes and systems that may be used to control the general functionality of steering system 20, including the above-described steering angle control mode, not broadcast an error state unless a request for steering control is actually received (i.e., an actual steering angle δ is commanded or input). In the present scheme, the request for control is sent earlier than in other system designs, resulting in system 10 being made aware sooner, if steering control is unavailable due to a fault. In this respect, system 10 can terminate the hitching process and notify the driver very shortly after the user-readiness command 214 is given (e.g., the driver shifts to neutral). Otherwise, the driver would not be informed of such a fault until after the maneuver command 222 is given.

Figure 7:
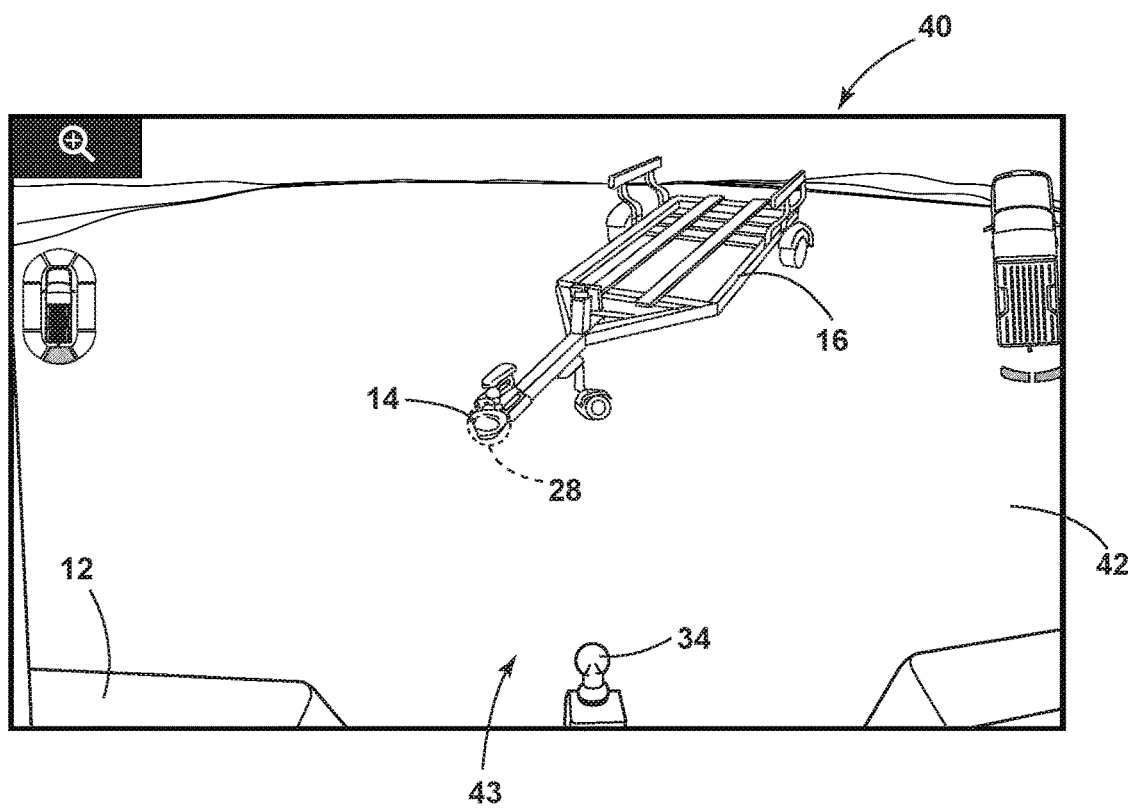
FIG. 7 is a depiction of an image received from a vehicle camera during the alignment sequence step of FIG. 6.
Figure 8:
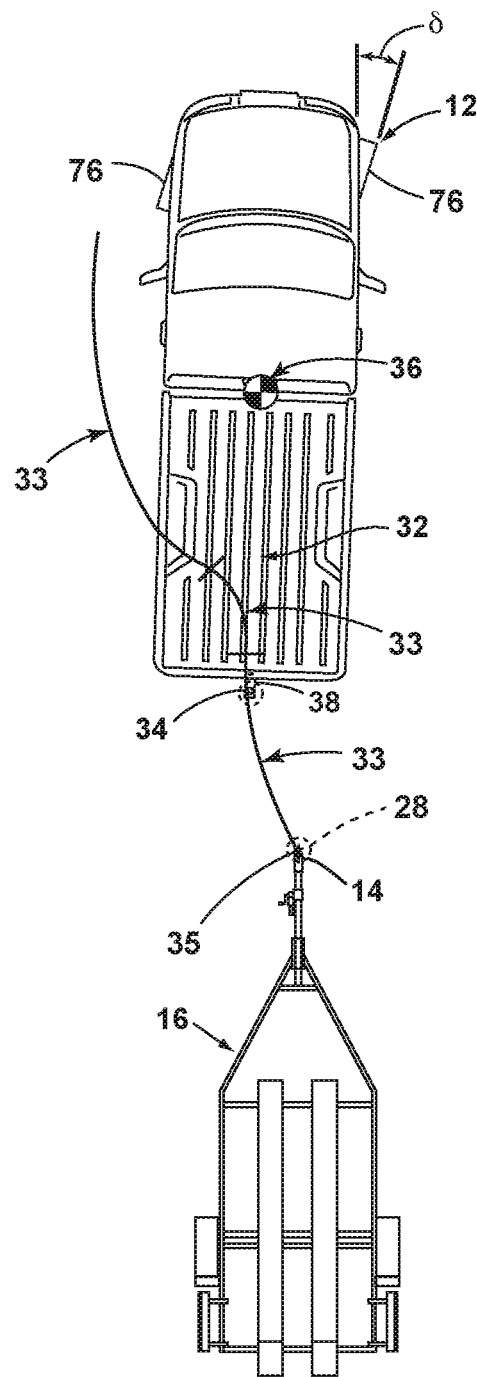
FIG. 8 is an overhead schematic view of the vehicle during a subsequent step of the alignment sequence with the trailer.

With additional reference to FIGS. 6-10, once user gives the maneuver command 222, the operating routine 68 may guide vehicle 12 using hitching maneuver 224 until hitch ball 34 is positioned relative to coupler 14 for coupler 14 to engage with hitch ball 34 when coupler 14 is lowered into horizontal alignment therewith. In the example discussed above, image processing routine 64 continuously monitors the positioning $D_c$, $α_c$ of coupler 14, constantly or once available, during execution of operating routine 68, including as coupler 14 comes into clearer view of rear camera 48, as shown in FIG. 7, with continued movement of vehicle 12 along path 32, as shown in FIG. 8. As discussed above, the position of vehicle 12 can also be monitored by dead reckoning device 24 with the position 28 of coupler 14 being continuously updated and fed into path derivation routine 66 in case path 32 and or endpoint 35 can be refined or should be updated (due to, for example, improved height $H_c$, distance $D_c$, or offset angle $α_c$ information due to closer resolution or additional image data), including as vehicle moves closer to trailer 16, as shown in FIG. 8. Still further, the coupler 14 can be assumed to be static such that the position of vehicle 12 can be tracked by continuing to track the coupler 14 to remove the need for use of the dead reckoning device 24. In a similar manner, a modified variation of operating routine 68 can progress through a predetermined sequence of maneuvers involving steering of vehicle 12 at or below a maximum steering angle $δ_{max}$, while tracking the position $D_c$, $α_c$ of coupler 14 to converge the known relative position of hitch ball 34 to the desired position 38*d* thereof relative to the tracked position 28 of coupler 14, as discussed above and shown in FIG. 9.

Figure 9:
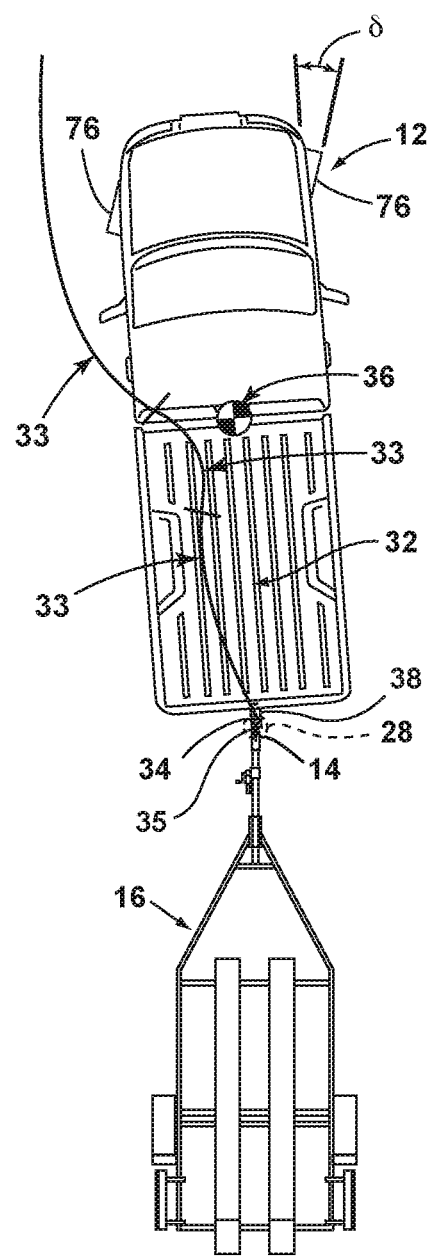
FIG. 9 is an overhead schematic view of the vehicle during a subsequent step of the alignment sequence with the trailer and showing the position of a hitch ball of the vehicle at an end of a derived alignment path.
Figure 10:
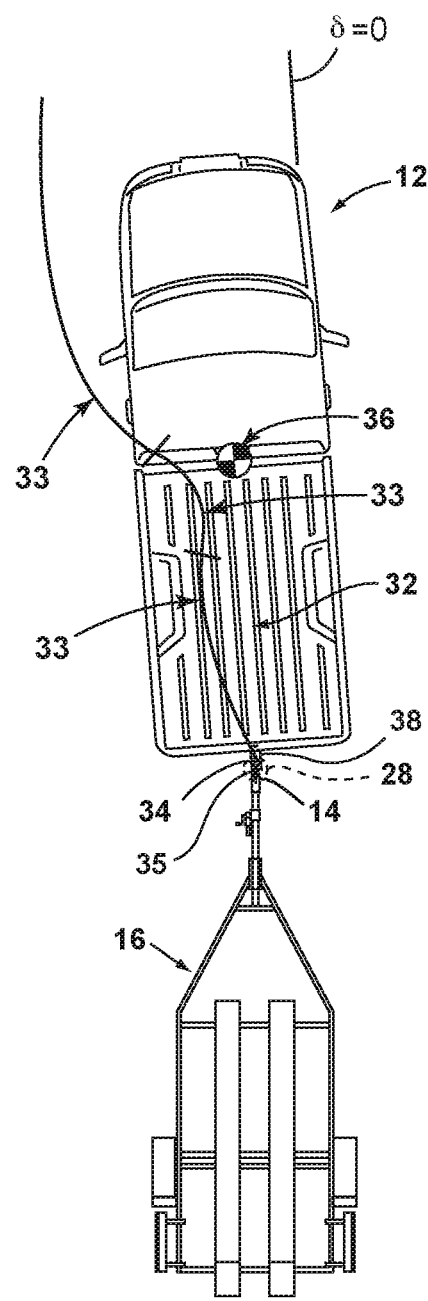
FIG. 10 is an overhead schematic view of the vehicle during a subsequent step of the alignment sequence in which steered wheels of the vehicle are returned to a centered position.
Figure 11:
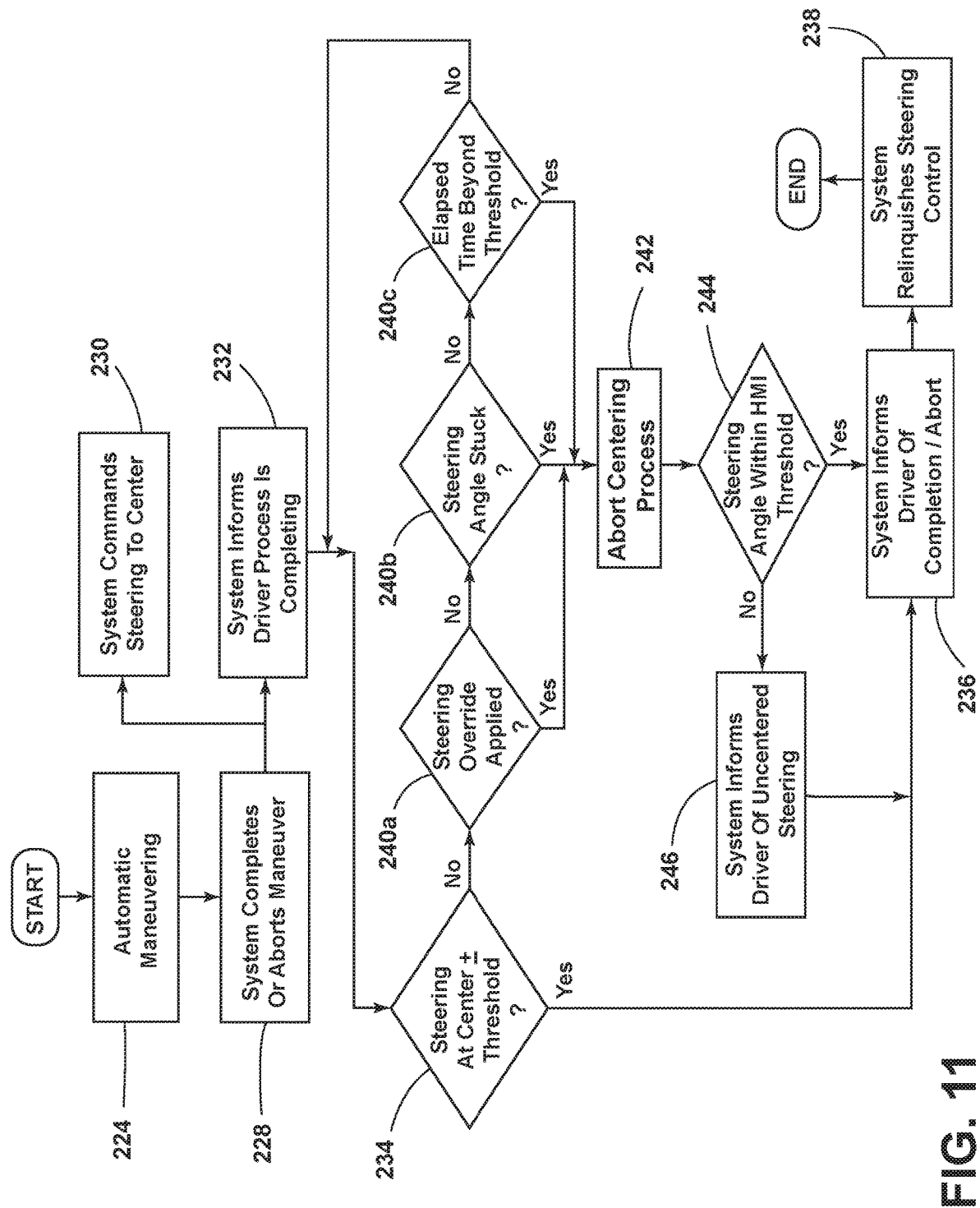
FIG. 11 is a flowchart depicting steps in the alignment sequence, including for the vehicle relinquishing control of a vehicle steering system to a driver.

After system 10 causes vehicle to reach and stop at the position shown in FIG. 9, in which the hitch ball 34 of vehicle 12 is aligned 226 (FIG. 4) with the coupler 14 of trailer 16, system 10 can end the automated hitching maneuver 224 and execute a process according to the present disclosure, illustrated in FIG. 11, to give control of vehicle 12 and, in particular, steering system 20, to the driver. In some aspects, system 10 may cause activation of the parking brake 98 when the desired position is reached so that vehicle 12 does not move from the aligned position when the vehicle service brakes 71 are released. According to the present disclosure, this and other similar actions taken to maintain the position of vehicle 12 are considered a part of the step of completing the automated hitching maneuver 224. Once the automated hitching maneuver is complete, or if the maneuver is aborted (for various reasons, which may include driver interference with steering wheel 30 or brakes 71, imaging system 18 losing visibility of coupler 14, unexpected vehicle 12 movement, driver releasing a keep-alive button, or the like), the system can in one aspect move 230 the steered wheels 76, if necessary, to a centered position (i.e. a zero degree turn position, or a steering angle δ having a zero value), as depicted in FIG. 10.

The action of the system in moving 230 the steered wheels can be beneficial to the driver in subsequent control in driving vehicle 12. In particular, when the system 10 completes or aborts the automated hitching maneuver 224, the steered wheels 76 are left at the angle δ last commanded by the system 10. This angle δ may be close to the maximum steering angle $δ_{max}$ to either the left or right, which may not be apparent to the driver, as the steering wheel 30, while remaining coupled with the steered wheels 76, does not directly align with the steered wheels 76 through the respective ranges of motion. Because the driver does not actually turn the wheel during the automated hitching maneuver 224, the driver may be potentially unaware of the actual steering angle δ, which may be inconvenient when the driver begins driving. For example, if a trailer is hitched and the driver begins driving the vehicle 12 in reverse, a trailer jackknife condition may result. If the vehicle 12 is driven in the forward direction, the trailer 16 may collide with a neighboring object, due to the geometry of pulling a trailer 16 out of its parked position while turning. Other examples of adverse vehicle 12 maneuvering at an unknown high steering angle δ may be further apparent. Further, a handoff by system 10 of the vehicle 12 in such a state may not meet driver expectations and may be frustrating. In this respect, it may be generally desired that, after various executions of the automated hitching maneuver 224 are completed, system 10 consistently leaves the vehicle 12 the same state. If the vehicle 12 is repeatedly left in the same state when control is released by the system 10, the driver can easily understand and expect this behavior by the system 10, potentially leading to less driver confusion.

The movement 230 of the steered wheels 76 to the centered position is carried out by system 10 in a similar manner to movement of the steered wheels 76 during the automated hitch maneuver. In particular, controller 26 sends a zero-degree steering angle command δ to steering system 20, operating in the above-described steering angle control mode, whereby the steering system 20 uses steering motor 74 to move the steered wheels 76, as discussed above with respect to FIG. 5, to the desired position. Because the steering wheel 30 remains coupled with the steered wheels 76, the movement of the steered wheels 76 to the centered position also causes the steering wheel 30 to move to a centered position. In at least one aspect, such movement signals to the driver that the steered wheels 76 are moving to the centered position.

After the steered wheels 76 to move 230 to the centered, zero-degree turn position, the controller relinquishes control 238 of the steered wheels 76 (for example, by having controller 26 end operating routine 68 and changing operation of steering system 20 to a torque-based, normal operating mode). The step of moving the steered wheels 76 to the centered position, however, may take an appreciable amount of time, depending on the final steering angle δ commanded by operating routine 68. The time needed to complete this step may not meet the expectations of the driver regarding system 10 behavior such that the driver may not immediately know whether the maneuver was completed successfully or was aborted. To communicate the system 10 state to the driver at an advantageous time, system 10 may present 232 a message or animation via HMI 40 on the display 44. Some examples are shown in FIGS. 12A, 12B, and 12C. In particular, in FIG. 12A a message 110 is shown on display 44 that indicates to the user that the system is in the process of aborting the maneuver (i.e., that the system 10 has determined that the operating routine should be ended and is preparing to return control of steering system 20 to the driver, including by moving the steered wheels 76 to the centered position). Further, in FIG. 12B as similar message 112 is presented to the user to communicate successful completion of the maneuver by alignment of the hitch ball 34 with the coupler 14. An alternative communication for either such situation is shown in FIG. 12C, wherein system 10 presents an animation 114 indicating system activity resulting in a delay.

Returning to FIG. 11, once the command to move 230 the steered wheels 76 to the centered position, system 10 continuously evaluates 234 the steering angle δ for indication that the steered wheels 76 have reached the desired centered position, including by further communication with angle sensor 78. When an indication of the desired steered wheel 76 position is given, system 10 informs 236 the user that the maneuver is complete or has been aborted and relinquishes control 238 of the steering system 20 to the user. Notably, a threshold steering angle δ value may be used to determine if the steering may be considered "centered." While system 10 commands a steering angle δ of zero to the steering system 20, the actual steering angle δ may not actually reach zero, in light of potential real-world actuation and measurement imperfections. Thus, a threshold of ±10°, for example may be considered a reasonable approximation of straight ahead, or centered, steering, and can, therefore, be used as the criteria for considering the return-to-center movement 230 as complete.

As long as the steering angle δ is not within the acceptable threshold, system 10 may perform additional checks to determine if the system 10 should abort 236 the control procedure, or if system 10 may continue attempting to change the steering angle δ towards 0. In one example, system 10 may monitor 240a torque sensor 80 to determine if the driver applies any steering torque to the steering wheel 30. The system 10 may interpret such action as a steering override, whether intentional or unintentional on the part of the driver, and can abort 242 the centering procedure. The system 10 may also monitor 240b a time-derivative of the steering angle δ to evaluate if the steering system 20 is responding to the centering command, as indicated by movement of the steered wheels 76 and a decrease in steering angle δ. If the system 20 observes a zero value for the steering angle δ time derivative, it may infer that the steering system 20 or steered wheels 76 are stuck and can similarly abort 242 the centering process. System 10 may also limit 242c the total amount of time allowed for the return-to-center process. If a threshold value (e.g. 30 seconds) is exceeded 240c, the centering process may be aborted 242.

After the centering process is completed or aborted 244, system 10 may provide an appropriate indication to the driver, including by an additional message on screen 44 of HMI 40. In some instances, system 10 may determine 244 that an aborted 242 centering process has achieved a final steering angle δ that may be considered close enough such that the process, although not being within the threshold for system 10 to stop the centering process as complete, may have a steering angle δ such that an abort warning 246 need not be given. The threshold value for step 244 may be larger than the value in determining 232 if the centering process is complete. For example, the threshold for centering completion may be ±2°, but the threshold for an abort indication in step 244 could be ±10°. In the event that the steering angle δ is above the threshold, the system 10 can notify 246 the driver, instead that the steered wheels 76 were not centered, but that control is still being given to the driver. If the steering angle δ is below the threshold, the system 10 can notify 236 the driver that the process has been complete, without an indication that the steered wheels 76 are not centered. As discussed above, after the appropriate message is given, the controller 26 relinquishes control 238 of the steered wheels 76 (for example, by having controller 26 end operating routine 68 and changing operation of steering system 20 to a torque-based, normal operating mode). At such an instance, the process is considered complete and system 10 remains idle until a further initiation indication is given 200.

It is noted that the control acquisition process, discussed with respect to FIG. 4, and the control "handoff" process, discussed with respect to FIG. 11, may be implemented together in an implementation of system 10, as discussed herein. In other examples, variations of the system 10 may be configured to implement the acquisition process described herein, but may omit or alter that described handoff process. In further variations, a system 10 may be configured to implement the handoff process discussed herein, but may omit or alter the described acquisition process.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle hitching assistance system, comprising:
a steering system, including: steered vehicle wheels mounted on an exterior of the vehicle;
a steering wheel mounted in an interior of the vehicle and mechanically coupled with the steered vehicle wheels; and
a steering motor mechanically coupled with the steered vehicle wheels;
memory including at least one stored routine; and
a controller executing the at least one stored routine by:
upon activation of the system, acquiring control of the steered vehicle wheels by connection with the steering motor and causing the steering motor to move the steering wheel in a low-amplitude oscillation to indicate control of the steered vehicle wheels to a driver of the vehicle; and
after indicating control of the steered vehicle wheels, receiving a command to execute an automated hitching maneuver and controlling the steered vehicle wheels using the steering motor in reversing the vehicle toward a target trailer.

2. The system of claim 1, wherein, upon one of completing the automated hitching maneuver or no longer receiving the command to execute the automated hitching maneuver with the steered vehicle wheels in a non-zero steering angle, the controller causes the steered vehicle wheels to move to a position such that a steering angle of the steered vehicle wheels is zero.

3. The system of claim 2, wherein, after causing the steered vehicle wheels to move to the position such that the steering angle of the steered vehicle wheels is zero, the controller relinquishes control of the steered vehicle wheels.

4. The system of claim 1, wherein the controller causes the steering motor to move the steering wheel by an amount perceptible to a user of the system to indicate control of the steered vehicle wheels to the user.

5. The system of claim 1, wherein acquiring control of the steered vehicle wheels includes: determining an initial steering angle of the steered vehicle wheels; and
sending a command to the steering motor corresponding with movement of the steered vehicle wheels to the initial steering angle of the steered vehicle wheels.

6. The system of claim 5, wherein:
the steering system further includes a steering angle sensor, the controller being in communication with the steering angle sensor; and
the controller determines the initial steered vehicle wheel angle from the steering angle sensor.

7. A vehicle hitching assistance system, comprising:
a steering system, including:
steered vehicle wheels mounted on an exterior of the vehicle; and a steering motor mechanically coupled with the steered vehicle wheels;
memory including at least one stored routine; and a
controller executing the at least one stored routine by:
receiving a command to execute an automated hitching maneuver;
upon receiving the command to execute an automated hitching maneuver, acquiring control of the steered vehicle wheels by connection with the steering motor and causing the steering motor to move the steering vehicle wheel in a low-amplitude oscillation to indicate control of the steered vehicle wheels to a driver of the vehicle; and
executing the automated hitching maneuver including, after indicating control of the steered vehicle wheels, controlling the steered vehicle wheels using the steering motor; and
ending the automated hitching maneuver with the steered vehicle wheels positioned at a non-zero steering angle and causing the steered vehicle wheels to move to a position such that a steering angle of the steered vehicle wheels is zero.

8. The system of claim 7, wherein, after causing the steered vehicle wheels to move to the zero-degree turn position, the controller relinquishes control of the steered vehicle wheels.

9. The system of claim 7, wherein the controller further acquires control of the steered vehicle wheels by connection with the steering motor before being able to receive the command to execute the automated hitching maneuver.

10. The system of claim 6, wherein the steering system further includes a steering wheel mounted in an interior of the vehicle and mechanically coupled with the steered vehicle wheels.

11. The system of claim 10, wherein causing the steered vehicle wheels to move to the position such that a steering angle of the steered vehicle wheels is zero causes the steering wheel to move to a centered position.

12. A vehicle, comprising:
a steering system, including:
steered vehicle wheels mounted on an exterior of the vehicle; and
a steering motor mechanically coupled with the steered vehicle wheels;
memory including at least one stored routine; and
a controller executing the at least one stored routine by:
upon activation of the system, acquiring control of the steered vehicle wheels by connection with the steering motor and causing the steering motor to move the steering vehicle wheel in a low-amplitude oscillation to indicate control of the steered vehicle wheels to a driver of the vehicle;
after acquiring control of the steered vehicle wheels, receiving a command to execute an automated hitching maneuver and controlling the steered vehicle wheels using the steering motor; and
ending the automated hitching maneuver with the steered vehicle wheels in a non-zero steering angle and— causing the steered vehicle wheels to move to a position such that a steering angle of the steered vehicle wheels is zero.

13. The vehicle of claim 12, further comprising a steering wheel mounted in an interior of the vehicle and mechanically coupled with the steered vehicle wheels.

14. The vehicle of claim 13, wherein, after acquiring control of the steered vehicle wheels, the controller causes the steering motor to move the steered vehicle wheels to cause movement of the steering wheel to indicate control of the steered vehicle wheels.

15. The vehicle of claim 13, wherein causing the steered vehicle wheels to move to the position such that the steering angle of the steered vehicle wheels is zero causes the steering wheel to move to a centered position.

16. The vehicle of claim 12, wherein acquiring control of the steered vehicle wheels includes: determining an initial steering angle of the steered vehicle wheels; and sending a command to the steering motor corresponding with movement of the steered vehicle wheels to the initial steering angle of the steered vehicle wheels.

17. The vehicle of claim 12, wherein: after causing the steered vehicle wheels to move to the position such that the steering angle of the steered vehicle wheels is zero, the controller relinquishes control of the steered vehicle wheels; and the controller further acquires control of the steered vehicle wheels by connection with the steering motor before being able to receive the command to execute the automated hitching maneuver.

18. The system of claim 1, further including an imaging system in communication with the controller, wherein: the controller identifies the subject trailer in data received from the imaging system upon activation of the system and before acquiring control of the steered vehicle wheels.

19. The system of claim 1, wherein the controller requires that the command to execute the automated hitching maneuver be continuously received when controlling the steered vehicle wheels using the steering motor in reversing the vehicle toward the trailer.

\* \* \* \* \*